United States Patent
Denis (10) Patent No.: US 9,176,750 B2
(45) Date of Patent: Nov. 3, 2015

(54) TELEPHONE NETWORK SUBSCRIBER IDENTIFICATION CARD AND METHOD OF CONTROLLING AN ELECTRONIC DEVICE ADAPTED TO INTERACT WITH SUCH A CARD

(75) Inventor: Sylvestre Denis, Houilles (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 622 days.

(21) Appl. No.: 12/609,126

(22) Filed: Oct. 30, 2009

(65) Prior Publication Data

US 2010/0113094 A1    May 6, 2010

(30) Foreign Application Priority Data

Oct. 30, 2008 (FR) .................................. 08 06046

(51) Int. Cl.
*G06F 9/445* (2006.01)
*H04W 4/18* (2009.01)

(52) U.S. Cl.
CPC *G06F 9/445* (2013.01); *H04W 4/18* (2013.01)

(58) Field of Classification Search
CPC ......... H04W 4/00; H04W 12/06; H04W 4/12; H04L 67/02
USPC ....................................................... 455/444
See application file for complete search history.

(56) References Cited

U.S. PATENT DOCUMENTS

| 5,031,109 | A | 7/1991 | Gloton |
| 2001/0004234 | A1 | 6/2001 | Petelenz et al. |
| 2004/0054921 | A1* | 3/2004 | Land, III ...................... 713/200 |
| 2006/0054708 | A1 | 3/2006 | Koo et al. |
| 2006/0256074 | A1 | 11/2006 | Krum et al. |
| 2006/0279426 | A1 | 12/2006 | Bonnet et al. |
| 2007/0152829 | A1* | 7/2007 | Lindsay et al. ............. 340/572.3 |
| 2007/0207798 | A1* | 9/2007 | Talozi et al. .................. 455/423 |
| 2007/0297028 | A1 | 12/2007 | Wulff |
| 2008/0091605 | A1 | 4/2008 | Hughes et al. |
| 2008/0171577 | A1* | 7/2008 | Huang et al. .................. 455/558 |
| 2010/0060415 | A1 | 3/2010 | Goyet |

FOREIGN PATENT DOCUMENTS

| EP | 321 325 | 6/1989 |
| EP | 1 731 098 | 12/2006 |
| EP | 2031548 | 3/2009 |
| FR | 2 728 710 A1 | 6/1996 |
| FR | 2 761 219 A1 | 10/1998 |

(Continued)

OTHER PUBLICATIONS

French Search Report dated Jul. 6, 2009, in French application.

(Continued)

*Primary Examiner* — Michael Faragalla (74) *Attorney, Agent, or Firm* — Young & Thompson (57) ABSTRACT

A method of controlling an electronic device adapted to interact with a telephone network subscriber identification card includes the following steps:

detecting the start of interaction between the card and the device;

transferring from the card to the device a program that can be executed by a microprocessor of the device subject to the condition at least of the detection;

execution of the transferred program by the microprocessor.

7 Claims, 7 Drawing Sheets

(56) References Cited

FOREIGN PATENT DOCUMENTS

| | | |
|---|---|---|
| FR | 2888976 | 1/2007 |
| WO | 0029945 | 5/2000 |
| WO | 0131577 | 5/2001 |
| WO | 2005069195 | 7/2005 |
| WO | 2008092527 | 8/2008 |
| WO | WO 2008/092527 * 8/2008 ............. G06K 19/07 |
| WO | 2009027209 | 3/2009 |

OTHER PUBLICATIONS

Search Report dated Oct. 7, 2009 from FR0950859.

* cited by examiner

TELEPHONE NETWORK SUBSCRIBER IDENTIFICATION CARD AND METHOD OF CONTROLLING AN ELECTRONIC DEVICE ADAPTED TO INTERACT WITH SUCH A CARD

Telephone network subscriber identification card and method of controlling an electronic device adapted to interact with such a card The invention concerns a telephone network subscriber identification card and a method of controlling an electronic device adapted to interact with such a card.

BACKGROUND OF THE INVENTION

The use of telephone (for example mobile telephone) network subscriber identification cards is known in itself; these cards, generally produced in the form of microcircuit cards, hold information (some of which is secret) relating to the subscription to services provided by the network.

The presence of this card in a telecommunication electronic device (such as a mobile telephone) thus enables that device (thanks to information contained in the identification card) to connect to the network and to exchange data with other network devices, for example data representing the voice of a speaker and generally encrypted by means of a secret key contained in the identification card.

It has already been proposed that such cards might (by means of the microprocessor that they contain) control the use of functions of the electronic device that receives them, like SIM Toolkit commands.

Although this solution introduces some flexibility into how the combination of the electronic device and the identification card functions, its functioning depends on instructions executed by the electronic device (in practice by its microprocessor), in particular steps that are executed when the electronic device is initialized, which steps naturally influence the nature of the remaining functioning of the combination.

SUMMARY OF THE INVENTION

In order to improve on this state of affairs and to introduce even more flexibility into the design of such systems, the invention proposes a method of controlling an electronic device adapted to interact with a telephone network subscriber identification card, characterized by the following steps:

detecting a start of interaction between the card and the device;

transferring from the card to the device a program (including a plurality of instructions) that can be executed by a microprocessor of the electronic device subject to the condition at least of said detection;

execution of the transferred program by the microprocessor.

This enables use in the electronic device of the program transferred from the card (i.e. execution by the microprocessor of the device of the instructions included in that program) as soon as these two devices are interacting (for example by connecting the card to the device or switching on the device incorporating the card).

Moreover, the transfer step can be executed subject to the condition, in addition to said detection, of an indication of the absence of prior execution of the transfer step, so that the program is used only the first time that the devices interact.

In one embodiment that can be envisaged, the method includes a step of verifying the additional condition including:

the microcircuit card receiving an identifier of the electronic device;

comparison of the identifier received to an identifier stored in the card and relating to an electronic device to which the transfer step has already been effected.

A first option is for executing the program to instigate an exchange of data between the card and the device and thus be part of subsequent interaction between the two devices.

Another option is for executing the program to be part of installation of a data processing program in the device. Installation includes, for example, connection to a remote server, possibly using the telephone network.

Thus the invention further provides a telephone network subscriber identification card including means for interacting with an electronic device, means for sending the device, subject to the condition at least of initiation of the interaction, a program that can be executed by a microprocessor of the device.

As already indicated, the sending means can be adapted to send the program subject to the condition, in addition to said detection, of an indication of the absence of prior execution of the transfer step.

Likewise, the program can be adapted to execute a step of installing a data processing program in the device.

BRIEF DESCRIPTION OF THE DRAWINGS

Other features and advantages of the invention will become apparent in the light of the following description, which is given with reference to the appended drawings, in which:

FIG. 7 represents a variant that can be envisaged of some steps from FIG. 6a;

DETAILED DESCRIPTION OF THE PREFERRED EMBODIMENTS

Figure 1:
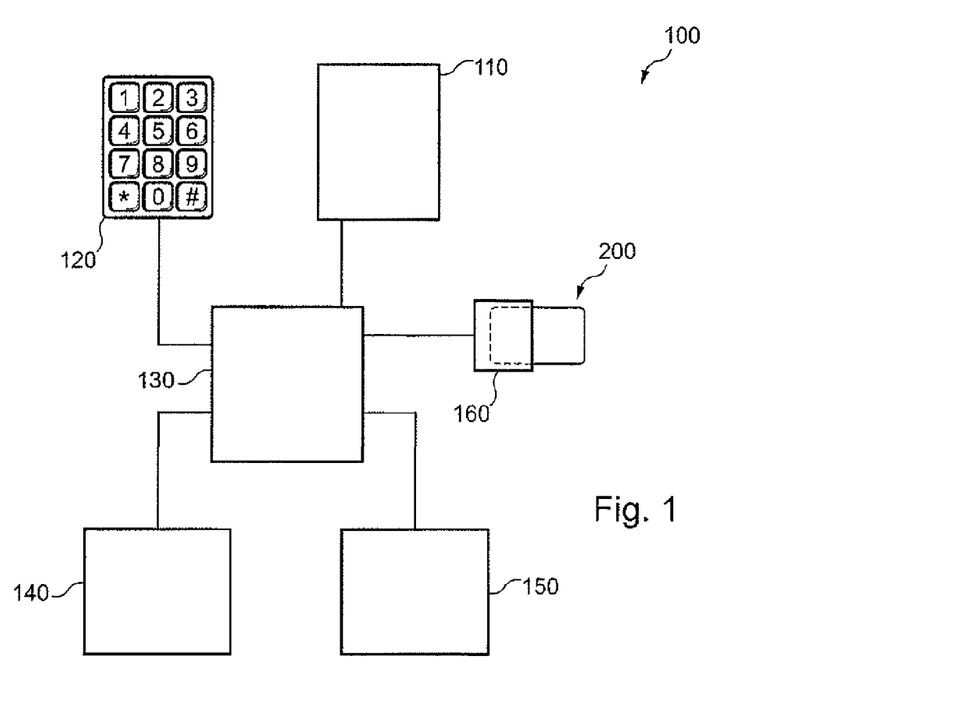
FIG. 1 represents the principal elements of a mobile telephone participating in the implementation of the invention.

FIG. 1 represents the principal elements of a telecommunication electronic device 100 (here a mobile telephone).

The mobile telephone 100 includes a microprocessor 130 with which are associated a non-volatile memory 140 (for example a Flash memory) and a volatile memory (or RAM) 150.

The mobile telephone also includes a keypad 120 and a screen 110 that form interface means with a user of the mobile telephone.

Finally, the mobile telephone accommodates a microcircuit card 200 (described in more detail hereinafter) adapted to exchange data with the microprocessor 130, for example, as here, via physical connection means 160. Alternatively, other means could naturally be provided for exchanging data between the microcircuit 130 and the microcircuit card 200, for example wireless communication means, possibly near-field wireless communication means.

Figure 2:
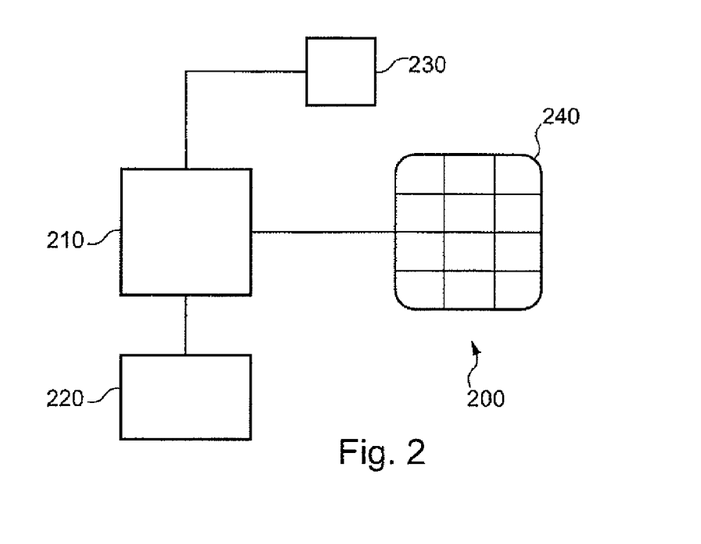
FIG. 2 represents the principal elements of a microcircuit card produced according to the teachings of the invention.

FIG. 2 represents the principal elements of the microcircuit card 200.

The microcircuit card includes a microprocessor 210 associated with a non-volatile memory 220.

An input/output interface 240 (which includes contacts intended to come into contact with corresponding contacts in the connection means 160) enables the microprocessor 210 of the microcircuit card 200 to interact with external devices, in particular the microprocessor 130 of the mobile telephone 100 when the microcircuit card 200 is in contact with the connection means 160.

The microcircuit card 200 also includes a movement sensor 230, here of the accelerometer type, that provides access to at least one component of the movement of the microcircuit card 200 in the terrestrial frame of reference, here by way of the acceleration of the microcircuit card in the direction of at least one of its dimensions.

Alternatively, the movement sensor 230 could be a gyroscope adapted to measure the speed of rotation of the card about an axis, for example. Another alternative is for the movement sensor 230 to be replaced by a position sensor, for example a magnetic sensor adapted to determine the position of the microcircuit card 200 relative to the terrestrial magnetic field (on this topic see for example patent application EP 1 731 098).

More than one position or movement sensor can naturally be used in the microcircuit card 200 without departing from the scope of the present patent application.

Moreover, in a first type of implementation that can be envisaged, the movement sensor 230 can deliver (here to the microprocessor 210) information indicative of the movement detected at a given time (either continuously or in response to a request from the microprocessor 210).

In a second type of implementation that can be envisaged, the movement sensor 230 can additionally store a plurality of detected values and thus deliver a history of those values (including the aforementioned plurality of values), for example with a particular period or alternatively at the request of the microprocessor 210.

The microcircuit card 200 is a telephone (in particular a mobile telephone) network subscriber identification card, such as a SIM (Subscriber Identity Module), USIM (Universal Subscriber Identity Module) or RUIM (Removable Universal Identity Module) card.

Figure 3:
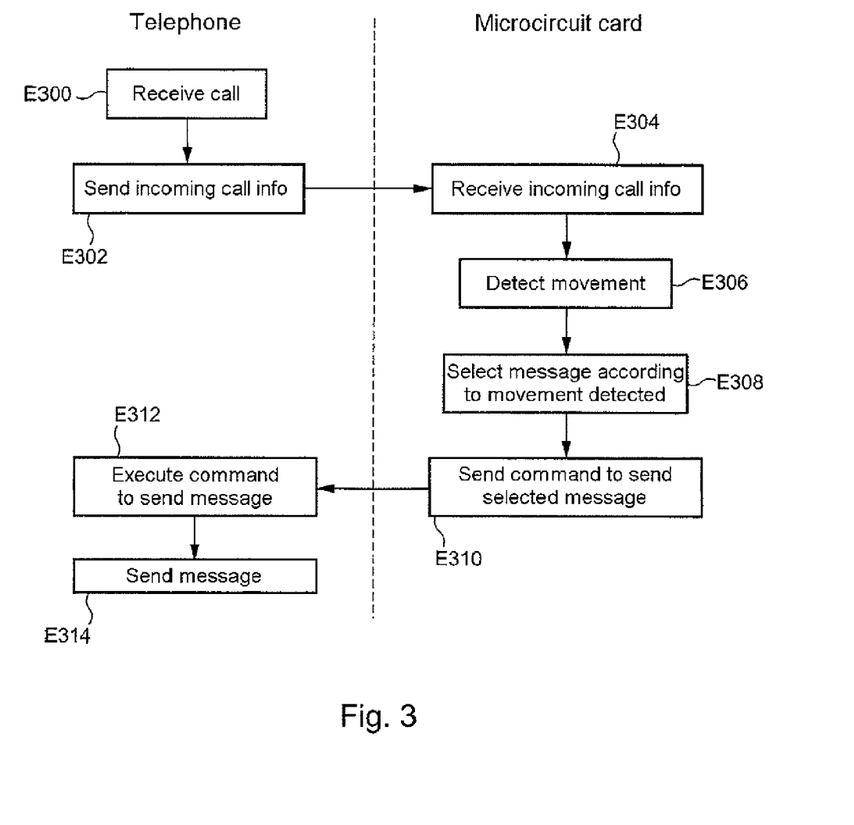
FIG. 3 represents a first example of an application that can be envisaged for the devices from FIGS. 1 and 2.

FIG. 3 shows a first example of an application for the devices just referred to that can be envisaged.

In this application, when the telephone receives a call from another electronic device connected to the same telecommunication network (step E300), it informs the microcircuit card 200 of this in the step E302 (for example by means of a SIM Toolkit event). The microprocessor 210 of the microcircuit card 200 then receives this information to the effect that an incoming call has been detected in the step E304.

The microprocessor 210 then executes in the step E306 a movement detection algorithm (or program) that uses the data from the sensor 230. Such an algorithm is stored in the non-volatile memory 220 of the microcircuit card 200, for example.

The microprocessor 210 then sends the microprocessor 130 of the mobile telephone 100 a command that depends on the type of movement detected.

For example, the microprocessor 210 selects a predetermined message in the non-volatile memory 220 as a function of the movement detected in the step E306 and sends a command, for example a SIM Toolkit command, to send the selected message via the mobile telephone network, for example by means of an SMS message (in which case the SIM Toolkit command used is "SEND SMS") or an MMS message; alternatively, a voice message can be sent.

This is a message of a first type, for example, if two taps on the telephone are detected (detection by the sensor of two series of low-amplitude vibrations) and a message of a second type (alternatively no reaction) in the case of repeated movement in one direction and then in the opposite direction. The messages of a first type and a second type and the movement with which each type of message is associated are stored in the non-volatile memory 220.

The SIM Toolkit command is sent to the microprocessor 130 of the mobile telephone 100, which receives it and executes it in the step E312, which causes in the step E314 transmission via the mobile telephone network of the message selected beforehand as a function of the movement detected by the movement sensor 230 of the microcircuit card.

Figure 4:
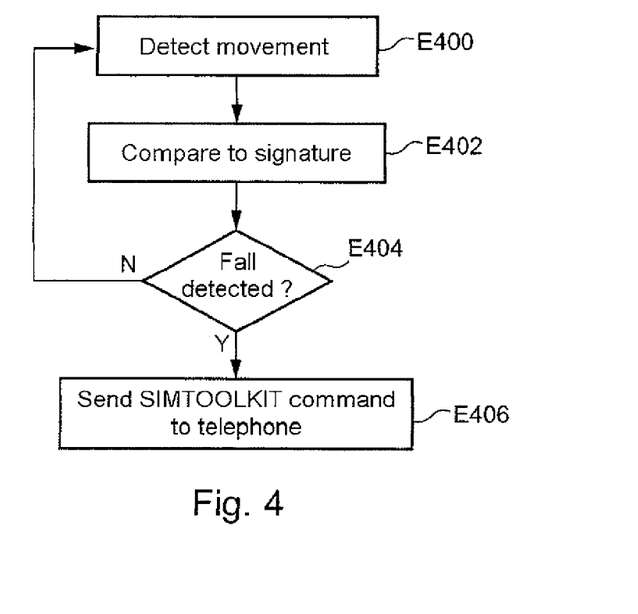
FIG. 4 represents a second example of an application for those devices.

FIG. 4 represents another example of application of the devices just described.

In this application, the movement sensor 230 detects continuously in the step E400 movement of the microcircuit card 200 (and consequently movement of the mobile telephone 100 carrying the microcircuit card 200).

The values of movement detected are periodically compared to a falling movement signature (for example stored in the non-volatile memory 220). On this topic see for example US patent application 2001/004234.

Whether falling has been detected is then determined in the step E404 (as a function of the result of the step E402 comparison).

If no falling has been detected, continuous detection of the movement continues in the step E400.

On the other hand, if falling is detected via positive comparison of the detected movement values and the signature stored in the non-volatile memory 220 (which signature corresponds to a person carrying the telephone falling, for example), the microprocessor 210 sends to the mobile telephone 100 a command executable by the microprocessor 130. This is a SIM Toolkit function as defined by the GSM 11.14 standard.

The command sent by the microprocessor 210 to the microprocessor 130 (and therefore sent via the interface 240 and the connection means 160) leads according to one option that can be envisaged to the generation of a call by the mobile telephone 100 via the mobile telephone network in order, for example, to alert an emergency center. A call with the carrier of the mobile telephone can be initiated (using the SIM Toolkit command "SET UP CALL").

Alternatively, the command sent by the processor 210 could generate the sending via the mobile telephone network of a message (for example an SMS message, in which case the SIM Toolkit command "SEND SMS" is used) which can in particular include the identity of the subscriber, possibly with other information (for example information as to the location of the mobile telephone 100 obtained either by identifying the cell to which the mobile telephone is connected in a cellular network or by GPS type positioning means, for example).

Clearly the mobile telephone thus sends a call or a message on the basis of a movement detected by the microcircuit card 200 without the mobile telephone having been configured beforehand to effect such detection.

Note that in the examples just described movement or the position of the mobile telephone 100 is deduced from movement or the position of the microcircuit card 200 because these two elements are physically linked.

It can nevertheless be desirable to indicate the position of the microcircuit card 200 in the mobile telephone 100 (in particular if commands initiated by movement depend on the relative orientation of the mobile telephone 100 and the microcircuit card 200). This is a configuration step that could naturally be effected only the first time the microcircuit card 200 is inserted into the mobile telephone 100.

According to a first implementation option, the position of the card 200 in the mobile telephone 100 could be indicated by the user via the keypad 120 in response to the display of a corresponding menu on the screen 110. The menu is preferably stored by the microcircuit card 200 (in the non-volatile memory 220) and its display by the telephone is commanded by a SIM Toolkit command "SELECT ITEM" sent by the card 200 to the mobile telephone 100.

According to a second implementation option, an application could be executed by the microprocessor 210 to cause the display on the screen 110 of a message prompting the user to perform a particular movement with the mobile telephone 100.

Detection by the movement sensor 230 in the card 200 of the particular movement of the telephone 100 performed by the user would thus enable the processor 210 to deduce the relative orientation of the microcircuit card 200 and the mobile telephone 100.

Figure 5:
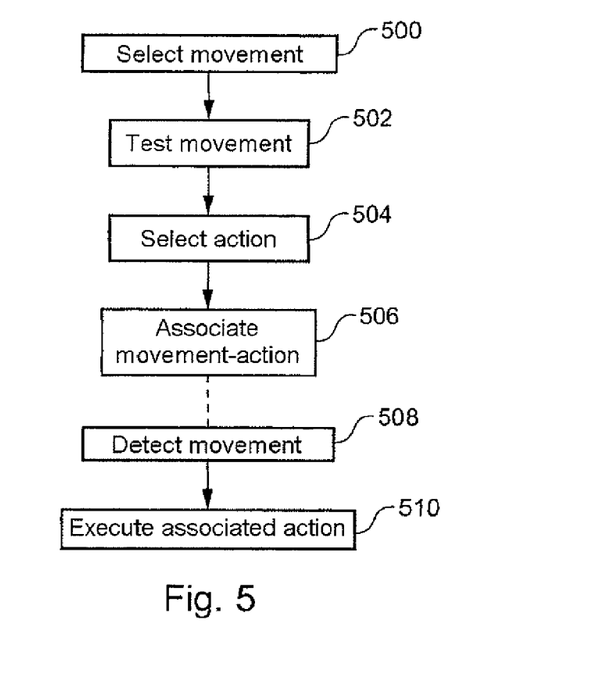
FIG. 5 represents a method that can be envisaged for configuring functions associated with movements of the FIG. 1 device.

FIG. 5 represents a method that can be envisaged for configuring the functions associated with movement of the telephone, for example in addition to what has just been described with respect to the position of the microcircuit card in the mobile telephone 100.

This method begins with displaying a representation of possible movements on the screen 110 of the mobile telephone 100 and the user selecting one of those movements by means of the interface (here the keypad 120) in the step E500.

According to one option that can be envisaged, the user could then be prompted to perform this movement in order to effect a test in the step E502: then, as a function of the movement actually performed, as detected by the movement sensor 230, information can be displayed enabling the user to reproduce the predefined movement more accurately, possibly by repeating the test of the step E502 if the movement performed by the user and detected by the movement sensor 230 is not sufficiently close to the predefined movement selected in the step E500 (for example in terms of the signature of the movement).

The user is then prompted to select by means of the interface 110, 120 an action to be associated with the movement selected in the step E500: the action to be associated is typically a function implemented by the mobile telephone 100, for example displaying a menu, calling a predetermined number, sending a message (for example an SMS message), connecting to the Internet or using wireless communication means other than those of the telephone network (for example Bluetooth or WiFi).

Once the action has been selected by the user, the movement selected in the step E500 is associated with the action selected in the step E504, for example by storing that association in the non-volatile memory 220.

Accordingly, during subsequent steps of the operation of the mobile telephone 100, if the movement previously selected in the step E500, for example a brief tap on the telephone detected by the sensor 230 as a brief low-amplitude movement, is detected by the movement sensor 230 as represented in the step E508, the microprocessor 210 requests (step E510) execution by the microprocessor 130 of the mobile telephone 100 of the action associated with the detected movement (for example display of a menu such as that of the operator), as described above, using an appropriate SIM Toolkit command, for example "SELECT ITEM" in the case of the example of displaying the menu of the operator referred to above.

In one embodiment that can be envisaged, the aforementioned steps E500 and E502 could be replaced by displaying a prompt to the user to perform a free movement and detecting the movement performed by the user, which is thereafter the movement associated with one of the actions that can be envisaged, as required by the user.

Figure 6A:
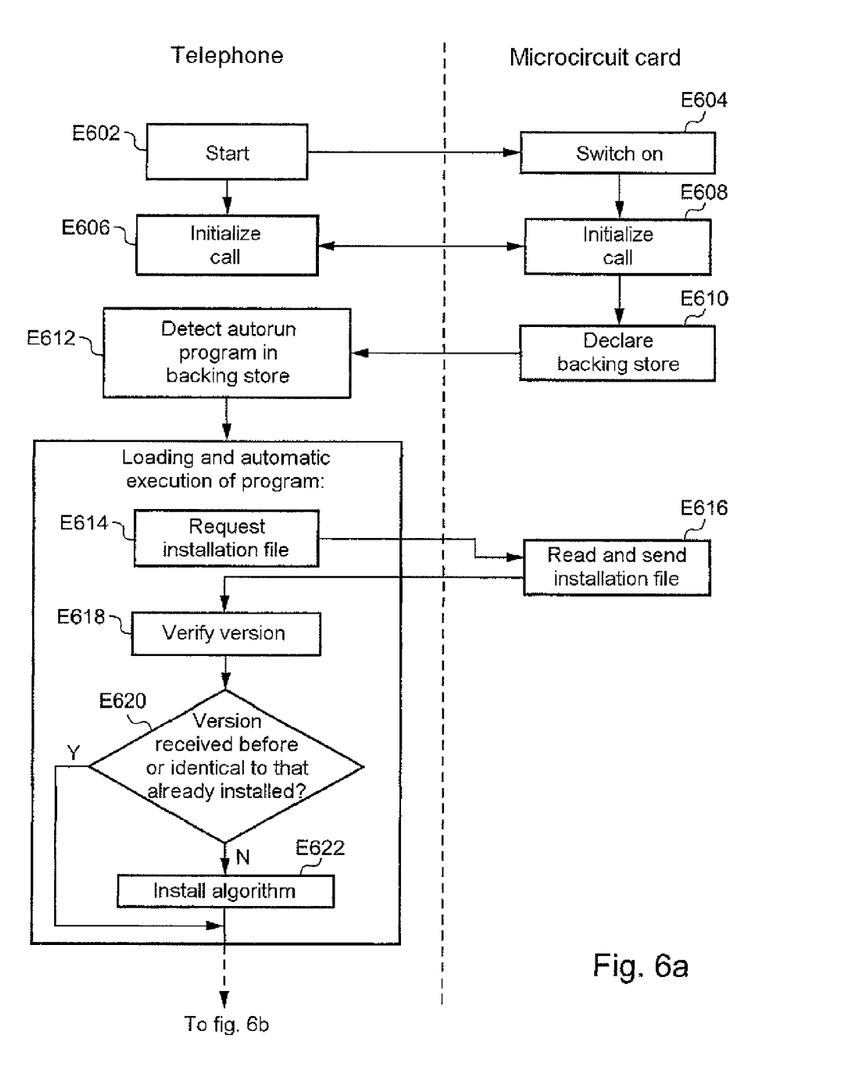
FIGS. 6a and 6b represent a method used in one possible embodiment of the invention.
Figure 6B:
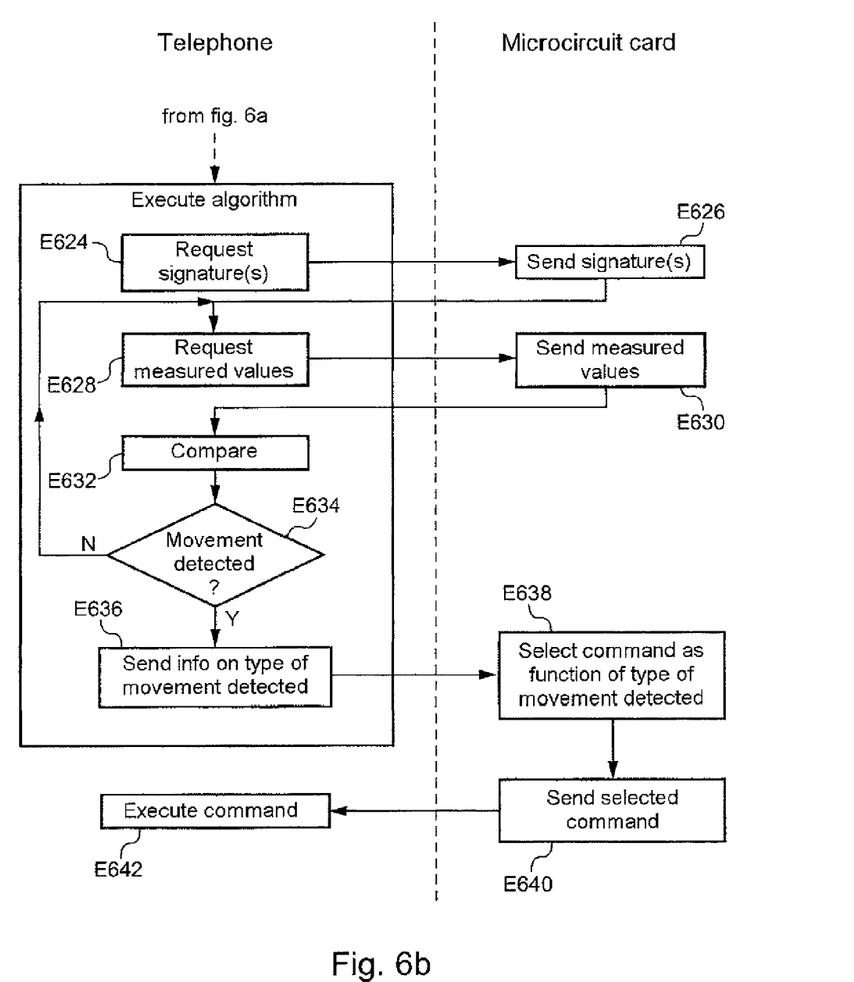

FIGS. 6a and 6b represent a method used in one possible embodiment in which at least some of the processing of the signals from the movement or position sensor 230 is carried out by the microprocessor 130 of the telephone 100.

In this method, the user switches on the telephone in the step E602, for example, which powers up the microcircuit card in the step E604 and initializes communication between these two entities (steps E606 and E608) in accordance with the ISO7816 and USB protocols (the microcircuit card 200 having contacts for communicating using these two types of protocol in accordance with the ISO7816-12 standard).

In the step E610 the microcircuit card 200 then declares (here using the USB protocol) at least part of the non-volatile memory 220 to be backing store (i.e. a mass storage). The declared backing store contains an autorun program to be executed automatically by the processor to which this backing store is connected.

Accordingly, the microprocessor 130 of the mobile telephone 100 detects this autorun program in the step E612 and loads the autorun program into its volatile memory 150 (from the backing store declared in the step E610) and executes it, which effects the steps E614 to E622 described next.

In the step E614, the autorun program sends the microcircuit card 200 a request for a file for installing an algorithm for processing data from the movement sensor.

The microcircuit card fetches the requested installation file from its non-volatile memory and sends it to the mobile telephone in the step E616.

The microprocessor 130 then verifies the version of the installation file received and in the step E620 compares it to the version of a file of the same type previously installed.

If a file of the same type has already been installed and the version that has just been received from the microcircuit card is earlier than or the same as the version already installed, the step E622 is not executed.

If not, there follows in the step E622 the installation of the processing algorithm by means of the files received in the step E616.

The processing algorithm that has just been installed as described above can then be executed at a later stage of the operation of the mobile telephone 100, for example as a background task.

In the example described here, this algorithm includes a step E624 in which it requests the movement signatures stored in the microcircuit card 200 (to be precise in the non-volatile memory 220).

The microcircuit card 200 sends the requested signatures in the step E626.

The processing algorithm also includes a step E628 of requesting from the microcircuit card 200 values representing the movement or position of the mobile telephone detected by the movement or position sensor 230.

Note in this regard that the requests of the steps E624 and E628 take the form of APDU commands, for example.

The measured values are sent to the telephone 100 in the step E630.

The processing algorithm includes a comparison step E632 in which the latest measured values received by the mobile telephone and the movement signature(s) are compared to determine in the step E634 if a particular movement has been detected.

If not, the processing algorithm returns to the step E628 (which is executed periodically) in which new values measured by the sensor 230 are requested by means of an APDU command.

On the other hand, if a particular type of movement has been detected in the step E634, in the step E636 the processing algorithm sends information indicating the type of movement detected to the microprocessor 210 of the microcircuit card 200.

On receipt of this information, the microprocessor 210 selects a command as a function of the type of movement detected as described above (step E638).

The selected command is sent by the microprocessor 210 to the microprocessor 130 of the mobile telephone 100 (for example in the form of a SIM Toolkit command).

The microprocessor 130 receives the selected command and executes it in the step E642.

The method that has just been described performs some of the processing, in particular processing that is greedy for memory and processor resources, in the mobile telephone 100, in order to lighten the processing load resulting from the presence of the movement or position sensor 230 in the microcircuit card 200.

However, thanks to the automatic installation of the processing algorithm, also as described above, the solution can be implemented in a mobile telephone not specifically prepared for this purpose.

As already indicated, all processing of data from the movement sensor and produced by determining actions (or functions of the telephone) to be performed as a consequence of the detected movement could be performed by the algorithm installed in the telephone. In this context, that algorithm could nevertheless use data stored in the microcircuit card, for example data describing the association between movements and corresponding actions stored in the non-volatile memory 220 of the microcircuit card 200.

It is moreover clear that automatic launching of the program, for example with a view to installing an algorithm, is not necessarily limited to the context of the present description.

Thus other applications can be envisaged, for example with the movement sensor 230 replaced by positioning means, for example a GPS receiver.

The algorithm installed in the mobile telephone 100 can then send the microprocessor 210 of the card 200 a request for the position as determined by the GPS receiver, for example. The microprocessor 210 then exchanges data with the GPS receiver in order to find out the position that has been detected and responds to the microprocessor 130 of the mobile telephone 100 by sending it data representing the detected position.

The microprocessor 110 (for example still under the control of the installed algorithm) can thus use the received position data, for example by looking up in a database (stored in the non-volatile memory 220 of the microcircuit card 200 or in a memory of the mobile telephone 100) information associated with the detected position (for example an advertising message or a list of sites of interest in the geographical sector associated with the detected position), and display that information on the screen 110 of the mobile telephone 100.

Figure 7:
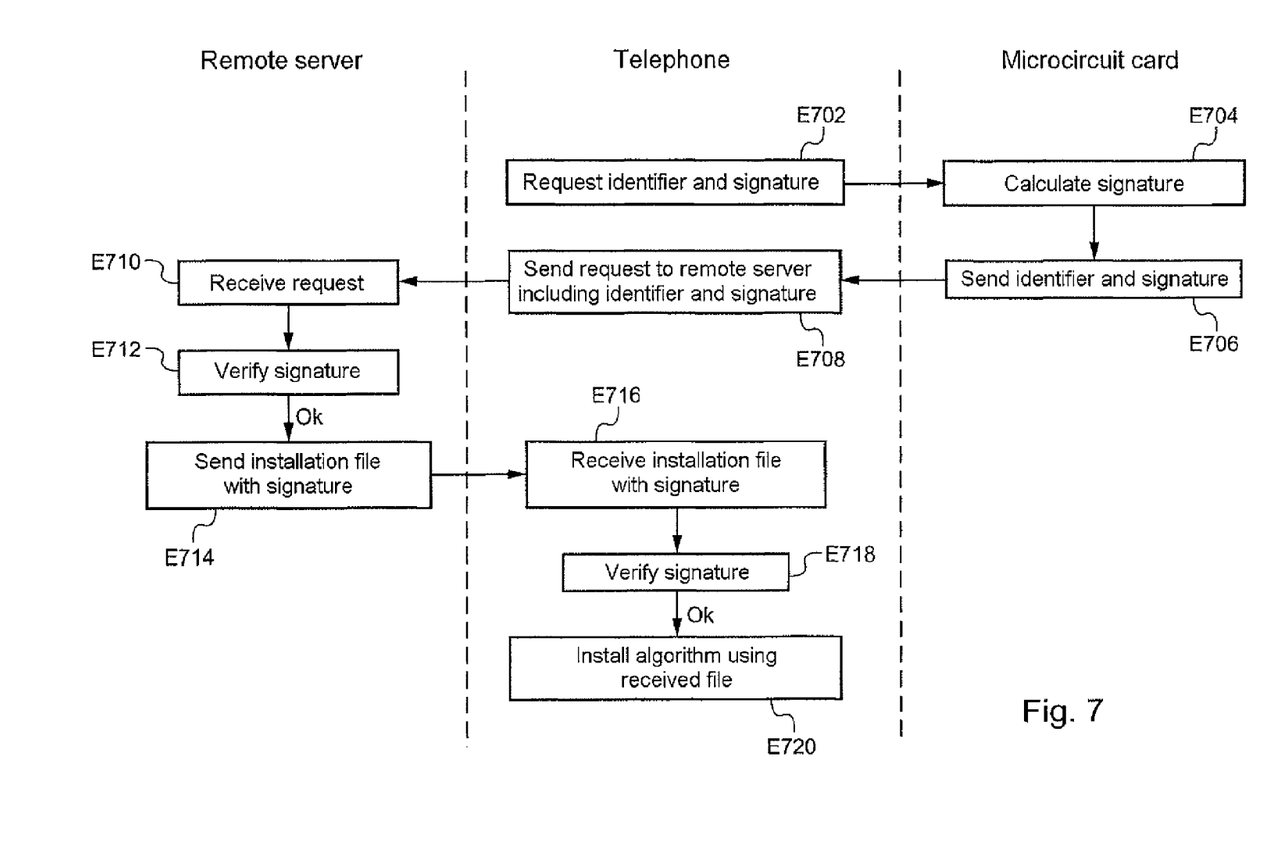

FIG. 7 represents a variant that can be envisaged of the steps E614 and E622 from FIG. 6a.

The steps of this method executed in the telephone (namely the steps E702, E708, E716, E718 and E720) are executed in an autorun program present in the microcircuit card and automatically loaded into and executed in the telephone as already described with reference to FIG. 6a (for this reason the preceding steps equivalent to the steps E602 to E612 in FIG. 6a will not be covered again in detail).

In the step E702, the autorun program causes the processor 130 of the telephone 100 to send the microcircuit card 200 a request for the latter to communicate an identifier of the subscriber and an associated signature.

The microcircuit card therefore calculates in the step E704 the cryptographic signature associated with the identifier of the subscriber (for example using a private key stored in the microcircuit card).

The microcircuit card then sends the identifier and the cryptographic signature to the telephone 100 in the step E706.

The telephone can thus send a request including the identifier and the signature to a remote server in the step E708.

The connection to the remote server is made using the means for connecting the mobile telephone 100 to the telephone network, for example (thus the call to the remote server can be made via the telephone network and then the Internet, for example).

To this end, the autorun program executed by the telephone includes a connection address for the remote server. (Alternatively, this address could be stored in the microcircuit card and obtained by means of a request from the telephone to the microcircuit card).

According to a variant that can be envisaged of the steps E702 to E708, the program automatically loaded from the microcircuit card into the telephone could include the identifier and the cryptographic signature of the microcircuit card, in which case the steps E702 to E706 would not be necessary.

After the step E708, the remote server receives the request in the step E710 and can therefore verify the cryptographic signature received in the step E712, for example by means of the public key associated with the private key of the card.

Means other than a signature could naturally be envisaged for authenticating the microcircuit card causing initialization of the method as described here, in which case the step E712 would verify the authenticity of the sender of the request.

When the signature has been verified, there follows the step E714 in which the remote server sends an installation file with an associated signature (or other means of authentication), which installation file can be selected from a plurality of installation files as a function of the identifier received in the step E710.

If the signature is not verified correctly in step E712, the process naturally terminates and step E714 is not executed.

If step E714 is executed, the telephone receives the installation file and the associated signature in the step E716.

The telephone (to be more precise the microprocessor 130) can then verify the signature (or other authentication means) in the step E718, enabling the legitimacy and/or the integrity of the applications that are loaded into the telephone to be checked.

In the event of positive verification, an algorithm for processing values from the movement or position sensor is installed in the telephone 100 using the installation file received in the step E716.

This algorithm can then be executed, for example as a background task, as described for the step E624 and the subsequent steps with reference to FIG. 6b.

Figure 8:
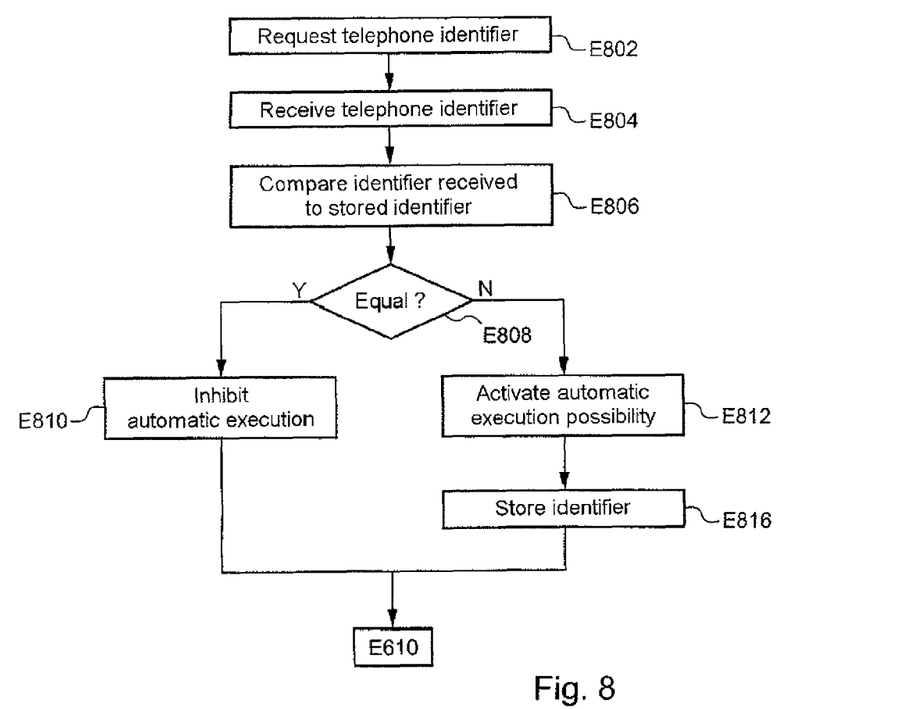
FIG. 8 represents a method that can be used when initializing the FIG. 2 microcircuit card.

FIG. 8 shows a process that can be executed on installing the microcircuit card 200 (as described with reference to FIG. 6 a propos the call in the step E608) in order to determine if this is the first use of the microcircuit card in the telephone and, if it is not, to inhibit automatic execution of the installation program as described above.

This process begins in the step E802 with a request for an identifier of the telephone from the microcircuit card, for example using the SIM Toolkit command Provide Local Information and the IMEI (International Mobile Equipment Identifier) option, enabling the microcircuit card to obtain the unique identifier IMEI of the telephone 100.

In the step E804 the microcircuit card 200 receives this identifier in response to the request and in the step E806 compares the identifier received and an identifier stored beforehand on previous executions of the process (on this topic see step E816 described hereinafter).

If the identifiers are equal (cf. step E808), there follows (step E810) inhibition of automatic execution of the program (see the description with reference to FIGS. 6a and 7): this inhibition is effected by modifying the name of the autorun file so that its name no longer indicates an autorun file, for example. Alternatively, the file could be moved or its attributes modified so that it is considered a hidden file and is therefore not executed automatically. Another option is simply to delete the file.

If the identifiers are not found to be equal in the step E808 (in which event this is considered to be the first time the mobile telephone has been switched on with the microcircuit card concerned in it), there follows the step E812 in which the option of automatic execution of the program is activated: depending on how it is inhibited, activation of the automatic execution option could consist in returning the name of the file to the form indicating it is an autorun file, moving the file into a directory enabling its automatic execution, modifying its attributes so that it is no longer considered a hidden file or reinstalling the automatic launching file (if previously deleted), if necessary by means of a remote connection using the communication means of the mobile telephone 100, for example by sending a remote server a request to obtain the file concerned including an identifier of the microcircuit card.

Once the automatic execution option has been activated in the step E812, the identifier received in the step E804 is stored in the step E816 in order to indicate upon subsequent switching on that a first switching on of the mobile telephone 100 with the microcircuit card 200 in it has already been effected.

Either way, the steps E810 and E816 are for example followed by the step E610 described with reference to FIG. 6a.

The foregoing embodiments are merely possible examples of implementation of the invention, which is not limited to them. The term movement refers to the evolution in space of the object concerned over time; a movement could thus consist of a number of individual movements (generally effected by the user).

The invention claimed is:

1. A telephone network subscriber identification card, comprising:
   a processing device;
   a memory device;
   an interface that, upon connection with an electronic device enables electronic communication with said electronic device;
   a non-volatile data storage device, having stored thereon program code executable by the processing device and a program that is executable by a microprocessor of the electronic device; and
   a movement sensor,
   wherein said program code, upon execution by the processing device, causes the interface, upon enablement of electronic communication with said electronic device, to transmit to the electronic device a copy of the program executable by the microprocessor of the electronic device, and
   wherein the program executable by the microprocessor of the electronic device comprises instructions for causing the microprocessor of the electronic device to process data generated and transmitted by the movement sensor located on the card.

2. The identification card according to claim 1, wherein the transmission of the copy of the program executable by the microprocessor of the electronic device is subject to an additional condition of an indication of the absence of a prior transmission of the copy of the program executable by the microprocessor of the electronic device.

3. The identification card according to claim 1, wherein the program executable by the microprocessor of the electronic device is adapted to execute a step of installing a data processing program in the electronic device.

4. The identification card according to claim 2, wherein the program executable by the microprocessor of the electronic device is adapted to execute a step of installing a data processing program in the electronic device.

5. The identification card according to claim 1, wherein the movement sensor is an accelerometer.

6. The identification card according to claim 1, wherein the movement sensor is an gyroscope.

7. A telephone network subscriber identification card comprising:
   a processing device;
   a memory device;
   an interface that, upon connection with an electronic device enables electronic communication with said electronic device;
   a non-volatile data storage device, having stored thereon program code executable by the processing device and a program that is executable by a microprocessor of the electronic device; and
   a position sensor,
   wherein said program code, upon execution by the processing device, causes the interface, upon enablement of electronic communication with said electronic device, to transmit to the electronic device a copy of the program executable by the microprocessor of the electronic device, and
   wherein the program executable by the microprocessor of the electronic device comprises instructions for causing the microprocessor of the electronic device to process data generated and transmitted by the position sensor located on the card.

* * * * *